United States Patent

Horowitz et al.

[15] 3,658,622

[45] Apr. 25, 1972

[54] PROCESS FOR MAKING WOOD LAMINATE

[72] Inventors: Frederick Horowitz, Coos Bay; Joseph B. Dede, Jr., North Bend, both of Oreg.

[73] Assignee: Georgia-Pacific Corporation, Portland, Oreg.

[22] Filed: Apr. 9, 1969

[21] Appl. No.: 814,827

[52] U.S. Cl. ............................ 156/331, 156/335, 161/270, 260/29.3, 260/32.4
[51] Int. Cl. ......................................................... C09j 1/00
[58] Field of Search ............... 156/331, 335; 260/29.3, 32.4; 161/270

[56] References Cited

UNITED STATES PATENTS

| 3,278,475 | 10/1966 | Spilker et al. | 156/331 X |
| 3,403,071 | 9/1968 | Perry et al. | 156/331 X |
| 3,463,747 | 8/1969 | Noll et al. | 156/335 X |

*Primary Examiner*—Carl D. Quarforth
*Assistant Examiner*—Stephen J. Lechert, Jr.
*Attorney*—Peter P. Chevis

[57] ABSTRACT

A plywood adhesive especially useful for bonding hardwood overlays to softwood plywood cores which comprises a urea-formaldehyde adhesive modified with a phenol-formaldehyde resin.

10 Claims, No Drawings

PROCESS FOR MAKING WOOD LAMINATE

This invention pertains to an adhesive useful in wood lamination, especially in plywood manufacture for the bonding of thin overlays to softwood cores. Adhesives, for example for plywood preparation, must have certain working characteristics in addition to the proper adhesive properties for a satisfactory performance under modern production methods. Even though good strengths may be possible under certain conditions with particular resins, the resins may not be suitable for plywood adhesives, if the working characteristics are such that these results cannot be readily achieved under the accepted production methods employed in plywood manufacture.

In many processes, the adhesive is applied by spraying. Thus, in addition to the requirements that the adhesive be fast setting, have a good pot life, and have the required penetration to form a strong bond, the consistency of the adhesive has to be such that it can be readily sprayable.

Further, in many operations, the assembled panels of plywood or laminated wood products are pre-pressed cold prior to heat setting of the adhesive. By pre-pressing the assembled panels, the capacity of the heated platen presses is increased and the quality of the laminated wood products or plywood obtained can be materially improved. In cold pre-pressing, the adhesive must form a sufficient bond to permit the handling of the pre-pressed panels without shifting or separation of the plys after the pressure is removed. The laminate or consolidated panel may be stored for various lengths of time for from a few minutes to hours after pre-pressing before the panels are subjected to the high temperature and pressure to finally set the adhesive. Thus, the adhesive, in addition to providing the necessary initial bond, must remain after pre-pressing in a form capable of forming a strong final bond upon heat setting.

Adhesives containing urea-formaldehyde resins which are light in color are often used in overlay plywood manufacture. However, the characteristics of the adhesives are such that the adhesives may not be applied by spraying. Phenol-formaldehyde adhesives often used in plywood operations and wood laminate production are likewise not entirely satisfactory for the overlay production. In the overlay production, the overlay panel or top ply applied to the core is less than 1/16 inch in thickness, generally being 1/20 to 1/30 of an inch in thickness. It is usually of hardwood or a wood of light color. Due to the thinness and porosity of the top ply, the phenol-formaldehyde resin adhesives will "bleed through" the veneer imparting dark streaks in the finished panel.

It is, therefore, an object of this invention to provide an adhesive for use in wood lamination. A further object is to provide an adhesive which is especially applicable to thin veneers and has characteristics enabling the adhesive to be applied by spraying and used in pre-pressing operations. A still further object is to provide a process for the lamination of wood using the above adhesive and the product thereof.

The above and other objects are attained, by this invention, by using a urea-formaldehyde adhesive composition which has been modified by the addition of a phenol-formaldehyde resin and acidified to a pH in the range of 5 to 7. The phenol-formaldehyde resin is intermixed in an amount of from 10 to 90 weight percent of the urea-formaldehyde resin with from 25 to 40 percent being preferred. In the preparation of the adhesive, the phenol-formaldehyde resin, pre-condensed under alkaline conditions to a particular degree, is intermixed with the extenders and other constituents such as fillers and accelerators, if used, prior to the addition of urea-formaldehyde resin and acidification of the adhesive mixture. In so preparing the adhesive, a readily sprayable, fast setting product is obtained which will not "bleed through" the thin veneers.

Urea-formaldehyde resins generally used in wood laminating adhesive are used for the preparation of the adhesive of this invention. Prior to the addition to the adhesive, the resins are usually prepared by the reaction of from 0.8 to 3.0 moles of formaldehyde per mole of urea under acidic conditions in an aqueous medium. The condensation of the urea-formaldehyde resin is advanced to the extent that the urea-formaldehyde resin, as a neutralized solution at a pH in the range of 7 to 10 containing about 65 weight percent resin, has a viscosity in the range of about 200 to 1,500 centipoises, preferably 300 to 1,000 centipoises.

The phenol-formaldehyde resins used in the modification of the urea-formaldehyde adhesives are the alkaline catalyzed resins similar to those used in plywood adhesives except that the resins are condensed to a lesser extent. The resins are usually prepared by reacting phenol with 0.8 to 3.0 moles of formaldehyde per mole of phenol, preferably from 1.6 to 2.5 moles of formaldehyde per mole of phenol, in an aqueous medium under alkaline conditions. The condensation is carried out only to the extent that the phenol-formaldehyde resin, as a solution at a pH in the range of 9 to 10 containing about 40 weight percent resin, has a viscosity in the range of 10 to 200 centipoises, preferably in the range of 25 to 100 centipoises.

In addition to the resins, additives or other constituents ordinarily used in the preparation of urea-formaldehyde adhesives for wood lamination such as plywood are usually employed in the preparation of the adhesives of this invention. These constituents are added in about the same ratio, with respect to the resin, as that normally employed for urea-formaldehyde resins with the ratios being, however, based upon the combined weight of the urea-formaldehyde and phenol-formaldehyde resins instead of the urea-formaldehyde resin alone. Amylaceous extenders such as wheat flour, starches, and tapioca are often used in amounts of from 50 to 200 weight percent of the resins. Extenders of proteinaceous material, such as soya flour or dried blood may also be added in amounts of from 5 to 25 weight percent of the resins. The protein extenders, especially dry blood, shorten the high temperature set time of the adhesive. Clays and other fillers and extenders, such as nutshell flour and agricultural residues, may likewise be added as well as acidic accelerators, such as, for example, acid amine salts as aniline hydrogen chloride, and the like.

In the preparation of the adhesive, generally the extenders, fillers, and other constituents of the adhesive are intermixed with the alkaline phenol-formaldehyde resin solution as obtained upon pre-condensation of the phenol with the formaldehyde. The urea-formaldehyde resin is then added to the adhesive and the mixture acidified to a pH in the range of 5 to 7 by the addition of organic or inorganic acids, or preferably, strong acidic salts such as the aluminum and ammonium salts of strong mineral acids such as sulfuric, hydrochloric, and nitric acids. The adhesive may be acidified during or shortly before or after the addition of the urea-formaldehyde resin. Aluminum sulfate which is readily available is most often used as the acidifying constituent. Generally, an amount of from 1 to 5 percent of aluminum sulfate, based upon the weight of the phenol-formaldehyde and urea-formaldehyde resins present, may be sufficient.

The adhesive thus prepared, using a phenol-formaldehyde resin condensed to a particular point, to modify the urea-formaldehyde adhesive will not become stringy as often is the case upon intermixing phenol-formaldehyde resin with urea-formaldehyde resin. The mixture usually has a viscosity in the range of 2,500 to 5,000 centipoises, maintains its consistency, and can be readily applied to wood laminates or plys by spraying. The "bleed through" which is normally obtained with thin plys with the phenol-formaldehyde resins is not obtained and the adhesive is satisfactory for pre-pressing operations. Good bonds are obtained upon cold pressing and the final heat setting.

The following example further illustrates the invention.

EXAMPLE I

In the preparation of a plywood panel with a hardwood veneer overlay of about 1/20 of an inch in thickness, a phenol-formaldehyde adhesive which was normally used was found to be unacceptable due to the "bleed through" of the adhesive through the thin veneer.

An adhesive was prepared by intermixing, in 450 pounds of water, 25 pounds of dried blood and 400 pounds of wheat flour with 140 pounds of an aqueous 40 weight percent solution of phenol-formaldehyde resin. The 40 weight percent solution of the phenol-formaldehyde resin at a pH of 9.5 had a viscosity of 50 centipoises. The resin was prepared by reacting formaldehyde and phenol in the presence of sodium hydroxide at a mole ratio of 2 moles of formaldehyde per mole of phenol.

After intermixing the above ingredients, 20 pounds of a 30 percent solution of aluminum sulfate, papermakers' alum grade, were added followed by 340 pounds of a 65 weight percent solution of urea-formaldehyde resin. The urea-formaldehyde resin had been prepared by condensing 1.8 moles of formaldehyde per mole of urea. The adhesive mixture was then further diluted with 150 pounds of water and was at a pH of 6.9. The adhesive had a good pot life and was readily sprayable. A good bond was formed upon cold pressing for 5 minutes so that the panel could easily be handled without shifting of the plys. It had a fast set time of about 3½ minutes at 250° F and 175 pounds per square inch. With glue spreads ranging from 45 to 65 pounds per thousand square feet of double glue line, hardwood overlay plywood manufactured was tested by the Vacuum-Soak Test. Test specimens (2 inch × 5 inch in size) were placed in a pressure vessel and completely submerged in 110° F water. A vacuum of 15 inches of mercury was drawn and maintained for 30 minutes and then released. Specimens were then allowed to soak in the same water at atmospheric pressure for 4½ hours with no additional heating. The specimens were then removed and dried for 15 hours at 150° F in an oven with forced-air circulation. The test pieces were then checked for continuous visible edge delamination of ¼ inch or more in depth and over two inches in length along any glue line. The panels met the standards set by the American Plywood Association receiving ratings of from 95 to 100 percent.

Upon the elimination of the aluminum sulfate, bleeding of the adhesive through the thin veneer was obtained and the initial bonds obtained upon pre-pressing were poor. Further, after a short time, the mixture became stringy and could not be properly dispersed by the use of a spray. An adhesive employing only urea-formaldehyde resin was likewise unsatisfactory. The mixture was gummy and could not be applied by spraying.

What is claimed is:

1. In a process for the manufacture of a wood laminate, wherein the wood laminations are bonded by a urea-formaldehyde adhesive composition comprising urea-formaldehyde resin and an extender, the improvement which comprises using a modified urea-formaldehyde adhesive composition in bonding said wood laminations, said modified urea-formaldehyde adhesive composition being an adhesive prepared by adding a phenol-formaldehyde resin to said urea-formaldehyde adhesive composition in an amount of from 10 to 90 weight percent of the urea-formaldehyde resin in the adhesive and acidifying the adhesive containing the phenol-formaldehyde resin to a pH in the range of 5 to 7, said phenol-formaldehyde resin being pre-condensed under alkaline conditions until a 40 weight percent aqueous solution of the resin at a pH in the range of 8 to 9 has a viscosity in the range of 10 to 200 centipoises at 25° C, and said phenol-formaldehyde resin being intermixed with the extender in the preparation of the adhesive prior to the addition of the urea-formaldehyde resin and acidification of the adhesive.

2. A process according to claim 1 wherein the phenol-formaldehyde resin is added in an amount of from 25 to 40 weight percent of the urea-formaldehyde resin and is pre-condensed until the 40 weight percent aqueous solution of the resin has a viscosity in the range of 25 to 100 centipoises.

3. A process according to claim 2 wherein the adhesive mixture is acidified by the addition of a salt selected from the group consisting of aluminum and ammonium salts of sulfuric, hydrochloric, and nitric acids.

4. A process according to claim 3 wherein the salt is aluminum sulfate.

5. In a process for the manufacture of plywood, wherein the wood plies are bonded by a urea-formaldehyde adhesive composition comprising a urea-formaldehyde resin and an extender, and wherein the adhesive is applied by spraying, and wherein the surface ply is less than 1/16 inch in thickness and the assembled panel prepressed prior to hot pressing, the improvement which comprises using a modified urea-formaldehyde adhesive composition in bonding the wood plies, said modified urea-formaldehyde adhesive composition being a urea-formaldehyde adhesive composition containing a phenol-formaldehyde resin in an amount of from 10 to 90 weight percent of the urea-formaldehyde resin in the adhesive, and acidified with an acid salt to a pH in the range of 5 to 7, said phenol-formaldehyde resin being condensed under alkaline conditions in a mole ratio of 0.8 to 3.0 moles of formaldehyde per mole of phenol until a 40 percent aqueous solution of the resin has a viscosity in the range of from 10 to 200 centipoises at 25° C, and said modified urea-formaldehyde adhesive composition being prepared by intermixing the constituents in an order such that the acidification and the addition of the urea-formaldehyde resin are made after the other constituents have been intermixed.

6. A process according to claim 5 wherein the phenol-formaldehyde resin is pre-condensed under alkaline conditions in a mole ratio of from 1.6 to 2.5 moles of formaldehyde per mole of phenol until the 40 weight percent aqueous solution of the resin has a viscosity in the range of 25 to 100 centipoises.

7. A process according to claim 6 wherein the adhesive mixture is acidified by the addition of aluminum sulfate prior to the addition of the urea-formaldehyde resin to the adhesive mixture.

8. A process according to claim 7 wherein the amount of phenol-formaldehyde resin added is in the range of from 25 to 40 percent of the urea-formaldehyde resin.

9. A process according to claim 7 wherein the modified urea-formaldehyde adhesive composition is prepared by intermixing the constituents in an order such that the phenol-formaldehyde resin is intermixed with constituents under alkaline conditions and subsequently the urea-formaldehyde resin is added and the adhesive acidified, said urea-formaldehyde resin being pre-condensed in a mole ratio of 0.8 to 3.0 moles of formaldehyde per mole of urea under acid conditions until the viscosity of a 65 weight percent aqueous solution of the resin has a viscosity in the range of from 100 to 1,500 centipoises at 25° C.

10. A process according to claim 9 wherein the urea-formaldehyde resin is pre-condensed until the viscosity of the 65 weight percent aqueous solution is in the range of 300 to 1,000 centipoises.

* * * * *